Feb. 23, 1937.  G. A. FINLAYSON  2,071,825
PACKING
Filed July 21, 1936
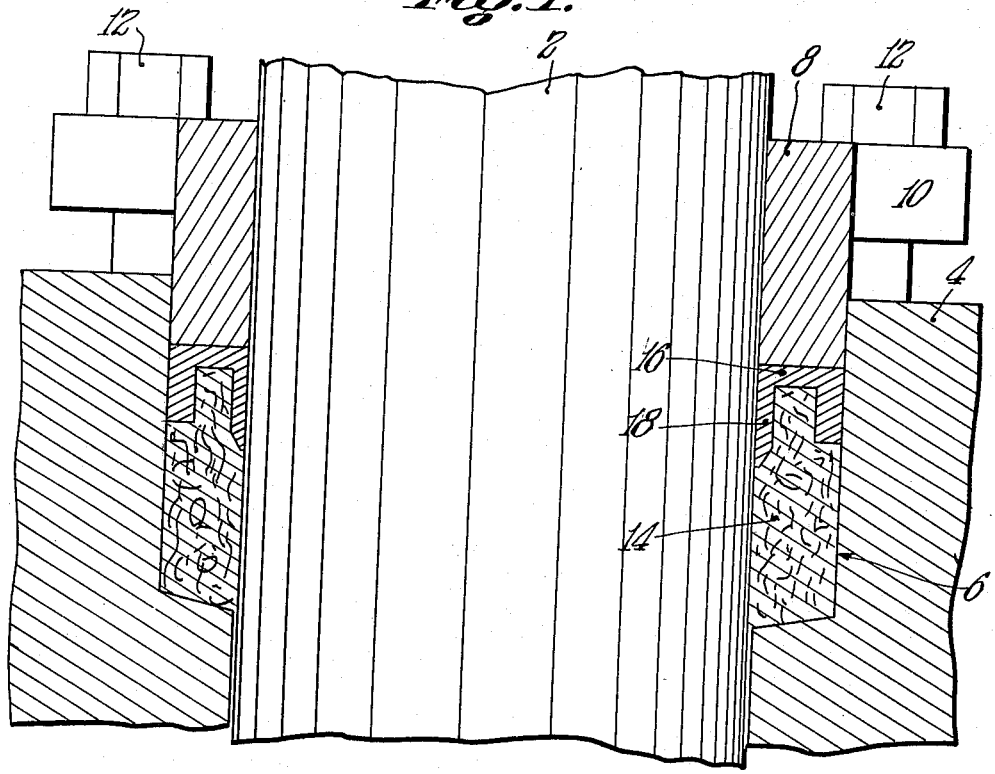
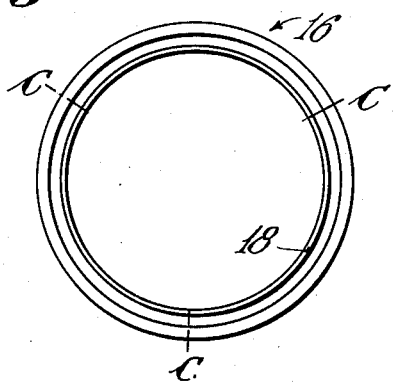
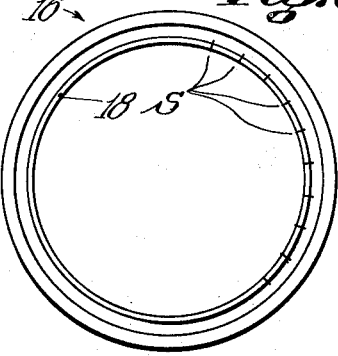
INVENTOR.
George A. Finlayson
BY
Walter C. Ross
ATTORNEY.

Patented Feb. 23, 1937

2,071,825

UNITED STATES PATENT OFFICE 2,071,825

PACKING

George A. Finlayson, West Springfield, Mass.

Application July 21, 1936, Serial No. 91,687

1 Claim. (Cl. 286—31)

This invention relates to improvements in stuffing boxes and is directed more particularly to improvements in means for retaining the packing in stuffing boxes.

The principal objects of this invention are directed to the provision in a stuffing box of means to prevent the packings from being forced outwardly therefrom.

In connection with stuffing boxes which are used with all kinds of reciprocating members, such as rams or piston rods, due to the action of the reciprocating member and the pressures, there is a tendency for the packing to be displaced. This results in leaks so that the stuffing boxes consequently require repacking frequently and the difficulty increases as the pressure increases.

According to this invention means is provided in the form of a retainer which is adapted to be disposed on top of the packing and this retainer is characterized by its ability to contract or yield.

That is to say, as the retainer wears due to the reciprocation of the reciprocating part which it surrounds, it contracts due to the pressure to which it is subjected so that it snugly fits the reciprocating part at all times so there is no space between it and the reciprocating part. A space soon develops between the stuffing box gland and the reciprocating part through which the packing finds its way but the means of this invention fits the spindle in such a way that there is no space.

Various other novel features and advantages of the invention will be hereinafter more fully referred to in connection with the accompanying description of the preferred form thereof, reference being had to the drawing wherein:

Fig. 1 is a sectional elevational view through a typical stuffing box having the novel features of the invention associated therewith; and Figs. 2 and 3 are small scale inverted plan views to explain certain features of the invention.

Referring now to the drawing more in detail, the invention will be fully described.

It may be here stated that the invention is adapted for broad application, and in connection with all sorts of reciprocating members such as piston rods, pistons, rams, or the like. To explain the invention there is represented at 2 a reciprocating member. This may be a piston rod, ram, or the like and a cylinder head is represented by 4.

It is usual to provide a bore 6 around the reciprocating member 2 to receive the packing 14 and a packing gland. In the illustration 8 represents a gland, the lower portion of which is receivable in the packing bore.

At 10 is represented the head of the gland and bolts, such as 12, are arranged to force the gland downwardly in the socket 6 to squeeze and press on the packing. In the ordinary case the packing is of fibrous material and is often treated with various substances.

Usually the gland 8 is forced downwardly onto the packing but, as is well known, the gland wears due to the reciprocation of the reciprocating member 2 and the packing material soon finds its way past the gland wherefore frequent repackings are usually necessary in connection with engines, hydraulic apparatus and the like or whenever it is necessary to pack a reciprocating member.

According to this invention there is provided a retaining ring member 16 which is preferably formed of metal. This is arranged to fit within the packing bore 6 and it is provided with an inner relatively thin lip or wall 18 which surrounds the reciprocating part 2.

This lip 18 may be provided by grooving the ring 16 as shown or in some other way. By making the lip relatively thin, it will be seen, it is relatively yieldable inwardly or contractible and adapted to snugly embrace the member 2. In this way the possibility of there being a space through which the packing may pass is overcome.

As the gland is screwed downwardly so as to bear on the ring 16 and force it onto the packing 14, the clamping action causes the packing to urge the lip inwardly. As the ring becomes worn due to the reciprocation of the reciprocating member, the gland may be screwed down to exert still more pressure so that the lip contracts or is urged inwardly to more snugly embrace the reciprocating member and yet permit the reciprocating member to freely reciprocate through the ring. Since the ring snugly embraces the reciprocating member, there is no space between it and the member 2 wherefore the packing does not work its way between the ring and the reciprocating member as is usual with the ordinary reciprocating member and gland construction.

The lip does not need to contract to any great extent since the wear on the ring will not be too great but, at all times, the pressure obtained in the packing bore or the pressure exerted by the gland will cause the packing to act on the lip so that it will snugly embrace the reciprocating member.

Piston rods, plungers, or rams, of course, vary in diameter within very wide limits and the rings may be made to accommodate them. Accordingly, in some cases it may be desirable to provide a retaining ring which is in sections.

To that end the ring may be cut in several places such as on the lines c in Fig. 2. This will facilitate the easy and ready handling and assembling of the parts where the ring is of large diameter. Otherwise, as in Fig. 3 it may be desired to provide the lips with a plurality of up and down cuts s, as shown in Fig. 3, which tend to enhance the flexibility of the lips.

I have found in connection with apparatus where several thousand pounds of pressure per square inch is employed that the packing is preserved over a period of at least two years by the use of the invention where heretofore it was necessary to repack the stuffing box every two or three weeks. According to the invention the ring is made so that it is contractible or is yieldable inwardly. This is facilitated by providing a section such as the lip which embraces the reciprocating member and is relatively thin so as to be adapted to be urged inwardly when pressure is applied thereto either by means of the gland or by pressure passing upwardly past the reciprocating member into the packing bore.

It may be desir in some cases to locate the ring 16 at the lower part of the packing bore as when it is used in connection with a vacuum pump or the like.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

The combination of a reciprocable member and a stuffing box therefor comprising, a part surrounding the reciprocable member provided with an enlarged bore having a bottom, yieldable packing in the bore, a gland in the upper part of the bore, means for moving said gland downwardly, and a ring member below said gland having an upper wall and outer and inner walls providing a space therebetween in which said yieldable packing is received, the outer wall being disposed against the wall of the bore and of less length than the inner wall and the inner wall embracing said reciprocable member and being relatively thinner than the outer wall and yieldable inwardly against the reciprocable plunger, the said inner wall being provided with cuts extending upwardly from its lower edge and the outer side thereof at said lower edge being tapered.

GEORGE A. FINLAYSON.